United States Patent

Schön

[11] 3,779,279
[45] Dec. 18, 1973

[54] CONDUCTIVITY MEASURING CELL
[75] Inventor: Kurt Schön, Zurich, Switzerland
[73] Assignee: Contraves AG, Zurich, Switzerland
[22] Filed: Oct. 27, 1972
[21] Appl. No.: 301,646

[30] Foreign Application Priority Data
Nov. 12, 1971 Switzerland.................... 16511/71

[52] U.S. Cl............................. 137/599, 324/71 CP
[51] Int. Cl. ....................................... G01n 27/00
[58] Field of Search.................. 137/599; 324/71 CP

[56] References Cited
UNITED STATES PATENTS
3,648,158   3/1972   Parker........................... 324/71 CP Primary Examiner—Robert G. Nilson
Attorney—Werner W. Kleeman

[57] ABSTRACT

A conductivity measuring cell for a counting apparatus for counting particles suspended in a fluid medium incorporating a suction channel communicating with a withdrawal channel by means of a calibrated bore serving as an electrical resistance measuring path. The suction channel flow communicates with the withdrawal channel through the agency of an auxiliary branch channel arrangement equipped with a through-passage which can be sealingly closed and opened.

7 Claims, 1 Drawing Figure

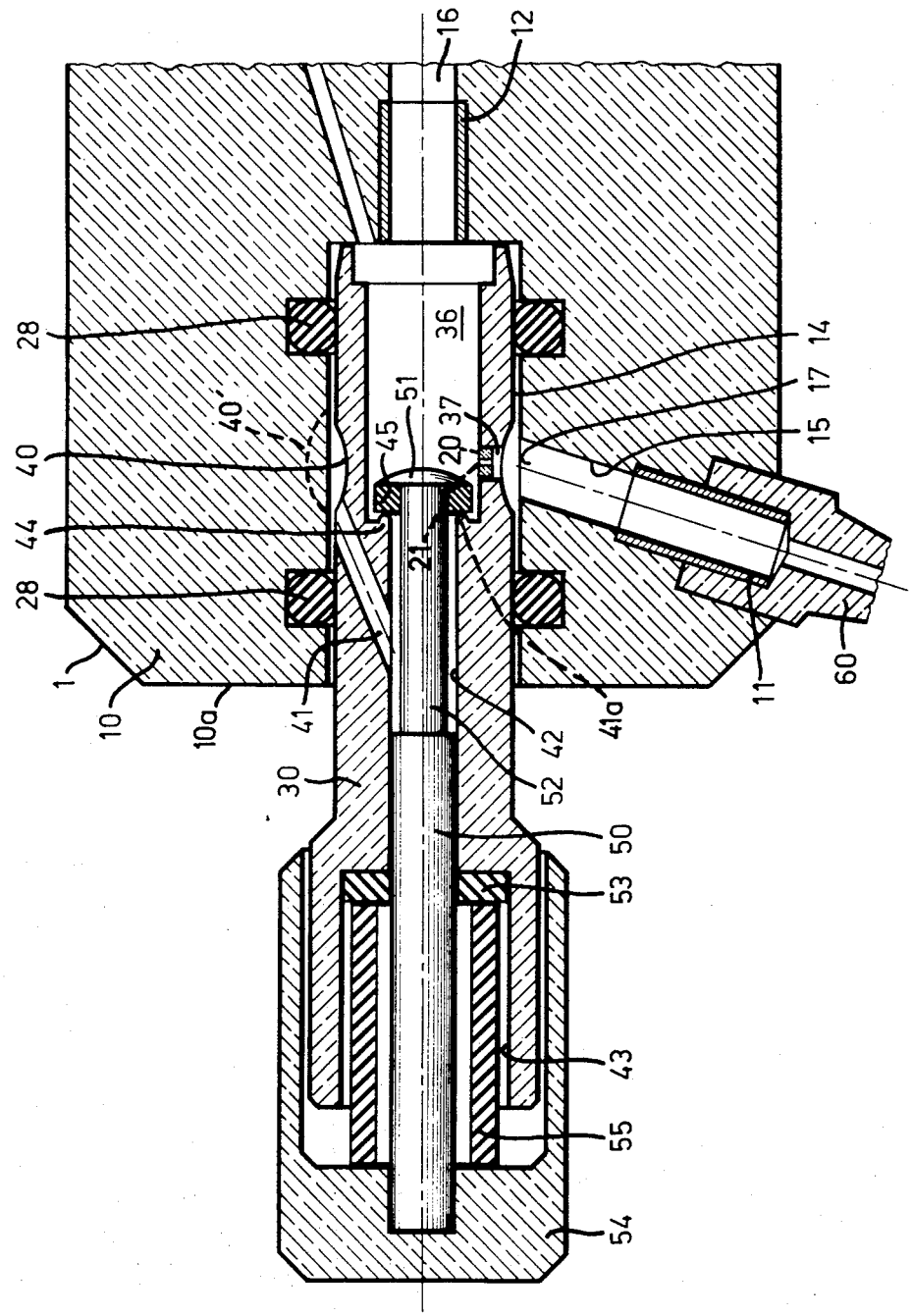

CONDUCTIVITY MEASURING CELL

BACKGROUND OF THE INVENTION

The present invention relates to a new and improved construction of conductivity measuring cell for a particle counting apparatus for counting particles suspended in a fluid medium, wherein a suction channel communicates with a withdrawal channel by means of a calibrated bore serving as an electrical resistance measuring path, and typically known in the art as an aperture.

Now in the commonly assigned U.S. Pat. No. 3,614,607, granted Oct. 19, 1971, and entitled "Particle Counting Apparatus" there is disclosed such type counting apparatus and in commonly assigned U.S. Pat. No. 3,648,158, granted Mar. 7, 1972, and entitled "Conductivity Cell" there is disclosed, in particular, an apparatus for measuring the electrical conductivity. With such particle counting apparatuses, the suction channel is still filled with air at the beginning of an initial measurement. Therefore, after initiating the suction operation the aperture support must be slowly inserted into the receiving recess provided at the electrode support or cell body. As soon as the aperture support or measurement path support has passed the first sealing member, the air is immediately displaced out of the region of the suction channel by the sucked-up sample suspension. The aperture support can be inserted until reaching a stop, at which time the equipment is then in a preparatory state for carrying out the measuring operation. If this manual venting is carried out without great care, then air bubbles can form at the suction channel in front of the aperture or measuring path, making it impossible to subsequently carry out an exact measuring operation. Moreover, also when exchanging the sample flasks which contain a fluid medium suspension which is usually sufficient for carrying out about four counting operations air can form in front of the aperture. But also gas bubbles which, for instance, are formed due to electrolysis at the surface of the electrode in the suction channel and initially remain located thereat can after a number of counting operations possibly influence the latter.

SUMMARY OF THE INVENTION

Hence, from the discussion above, it should be apparent that this particular field of technology is still in need of conductivity measuring cells for particle counters which are not associated with the aforementioned drawbacks of the prior art constructions. Therefore, it is a primary object of the present invention to provide a new and improved construction of conductivity measuring cell which effectively and reliably fulfills the existing need in the art and is not associated with the aforementioned drawbacks and limitations of the prior art constructions.

Another and more specific object of the present invention relates to an improved construction of conductivity measuring cell, especially useful for the counting of particles, and in particular in the environment of blood cell counters, which avoids the aforementioned drawbacks and eliminates erroneous counts by avoiding the formation of undesirable air and gas bubbles in the conductivity cell which could have such adverse effect.

Now in order to implement these and still further objects of the invention, which will become more readily apparent as the description proceeds, the invention contemplates that the suction channel is also connected with the withdrawal channel by means of an auxiliary branch channel arrangement having a throughpassage which can be tightly closed or sealed and opened.

BRIEF DESCRIPTION OF THE DRAWING

The invention will be better understood and objects other than those set forth above, will become apparent when consideration is given to the following detailed description thereof. Such description makes reference to the annexed drawing wherein there is shown in fragmentary sectional view a portion of an exemplary embodiment of conductivity measuring cell.

DETAILED DESCRIPTION OF THE PREFERRED EMBODIMENTS

Describing now the drawing, the exemplary embodiment of conductivity measuring cell 1 will be understood to encompass a substantially cylindrical-shaped cell body 10a defining an electrode support 10 and a likewise generally cylindrical-shaped measuring path or aperture support 30. Both the cell body 10a and the aperture support 30 are formed of conventional transparent plastic as is well known in this particular art. The cell body 10a is also provided with a connection means 60 which is carried by the electrode support 10 and serves for the sealing connection of a non-illustrated suction needle by means of which the fluid medium suspension can be sucked-up into the cell body 10a from a sample flask. The electrode support 10 also has provided thereat a substantially radially extending suction channel 15 at which there is arranged a tubular-shaped first electrode 11, a coaxial withdrawal channel 16 containing a tubular-shaped second electrode 12, and a cylindrical widened portion or enlarged bore 14 which extends coaxially with respect to the withdrawal channel 16. At the cylindrical widened or enlarged bore portion 14 there are embedded two sealing rings 28, each to one side of the outlet or mouth 17 of the radial suction channel 15.

The aperture support 30 which is removably sealingly inserted into the enlarged bore portion 14 is equipped with an axially extending blindhole bore 36 which constitutes an extension of the withdrawal channel 16. This aperture support 30 also possesses a radially extending bore 37 which communicates with the blindhole bore 36. A ruby or other suitable element 20 which is provided with a calibrated bore 21 serving as the electrical resistance measuring path or aperture is tightly inserted, for instance by a press fit, within the radial bore or channel 37 as shown. Now at the axial height of the aperture, there is provided at the circumference of the aperture support 30, a ring-shaped groove 40, the axial extent or diameter of which is designed to be somewhat wider than the diameter of the suction channel 15.

An axially extending throughflow bore 42 provided at the aperture support 30 possesses at one end a widened or enlarged bore portion 43 and communicates at its other end with the blindhole bore 36. Its mouth portion or opening 41a is designed as a closable throughpassage 44. The aperture support 30 is also equipped with an inclined channel 41 which connects the annular or ring-shaped groove 40 with the throughflow bore 42, as shown. Now at a portion of the through-flow bore 42 there is arranged the control plunger or rod 50 which is equipped at one end with a closure head 51 and a neck portion 52. At the other end of the control plunger 50, there is fixedly connected a filling or charging knob 54. This control plunger 50 can be axially displaced within the throughflow bore 42. At the rear face of the closure or valve head 51 there is arranged a sealing ring 45 which is mounted upon the smaller diameter neck portion 52 of the control plunger 50. At the enlarged bore portion 43 of the aperture support 30 there is mounted upon the control plunger 50 a sealing ring 53 by means of which the throughflow bore or channel 42 can be sealed towards the outside. A rubber resilient element, such as hose 55 functioning as a restoring or return spring is interposed between the inner situated end of the enlarged bore 43, in this case bears upon the sealing ring 53, and the inner end face of the filling knob 54 which is constructed as a sleeve body seated about the end of the aperture support 30 equipped with the enlarged bore portion 43.

Now in the rest position, the closure head 51 and therefore the sealing ring 45 are pressed against the closure or valve seat or the closable throughpassage 44 owing to the restoring action of the rubber hose 55 functioning as a resilient element or spring. As a result, the auxiliary branch flow circuit arrangemnt consisting of the ring-shaped groove 40, the channel 41, the throughflow bore 42 and the throughpassage 44, is closed. The fluid medium suspension to be measured can now only arrive from the suction channel 15 through the aperture 21 of the ruby 20 defining the electrical resistance measuring path into the bore 36 and the withdrawal channel 16. Now, in order to be able to rapidly and reliably vent at least the space in front of the electrical resistance measuring path or aperture prior to carrying out an initial measurement and to fill such with fluid medium suspension, a counting operation is initiated by pressing a conventional start button of the equipment, as a result of which there is also initiated sucking-up of the fluid medium suspension out of the sample flask. Now the filling head 54 is pressed inwards against the restoring action of the spring-like hose member 55 and is held in this position until the end of a counting operation. Due to pushing-in of the head 54 the throughpassage 44 is opened and the previously discussed auxiliary branch flow circuit arrangement is therefore freed. By virtue of this freed auxiliary branch flow circuit arrangement which possesses a much larger throughflow cross-section in contrast to the aperture or electrical resistance measuring path, air and/or gas is immediately sucked-off and replaced by the inflowing suspension. If the fluid medium suspension reaches the second electro-optical measuring arrangement at the volumetrically calibrated measuring tube, in the manner discussed in the aforementioned patents, then the counting operation is stopped and the withdrawal channel 16 and at least a portion of the bore 36 is vented by opening a gas channel, again in accordance with the disclosure of the aforementioned patents. By releasing the filling knob 54, the throughpassage 44 is again tightly sealed. The space in the suction channel 15 and the auxiliary branch conduit arrangement up to the region of the throughpassage 44 is now filled with fluid medium suspension and free of air and gas.

To carry out this venting operation, there are only required a few seconds, since the volume of fluid medium suspension required for a counting operation can flow much quicker through the auxiliary branch circuit than through the narrow bore of the aperture. The venting operation is advantageously also employed after each exchange of the measuring sample flask, since due to the suction action the remainder of the old fluid medium suspension will be removed from the conductivity measuring region of the conductivity cell and therefore there will be extensively avoided any falsification in the measuring accuracy of the new sample of fluid medium suspension through admixture with possibly remaining old sample medium. Insertion of the aperture support can be facilitated if the ring-shaped groove 40 is arranged at the electrode support, as indicated in phantom lines at 40′.

While there is shown and described present preferred embodiments of the invention, it is to be distinctly understood that the invention is not limited thereto but may be otherwise variously embodied and practiced within the scope of the following claims. Accordingly,

What is claimed is:

1. A conductivity measuring cell for a counting apparatus for counting particles suspended in a fluid medium, comprising a cell body provided with a suction channel and a withdrawal channel, an aperture support cooperating with said cell body, said aperture support including means defining an aperture serving as an electrical resistance measuring path for flow communicating the suction channel with the withdrawal channel, means defining an auxiliary branch channel arrangement for also flow communicating said suction channel with said withdrawal channel, said auxiliary branch channel arrangement including a throughpassage, and means for sealingly closing and opening said throughpassage.

2. The conductivity measuring cell as defined in claim 1, wherein said cell body is provided at the region of the suction channel with a substantially cylindrical widened bore portion for detachably receiving said aperture support, a ring-shaped groove arranged at the region of the cylindrical widened bore portion.

3. The conductivity measuring cell as defined in claim 2, wherein said ring-shaped groove is provided at said cell body.

4. The conductivity measuring cell as defined in claim 1, wherein said cell body is provided at the region of the suction channel with a substantially cylindrical widened bore portion for sealingly detachably receiving said aperture support, said aperture support being exchangeably mounted at said widened bore portion, said suction channel radially extending and opening via an outlet thereof into said widened bore portion, said aperture support including a portion received in said widened bore portion which is provided with a substantially axially extending bore and at substantially the axial height of the outlet opening of said suction channel substantially radially extending channel which flow communicates with the axially extending bore, said means defining said aperture being inserted in said radially extending channel, said auxiliary branch channel arrangement incorporating a substantially ring-shaped groove arranged at the region of the outlet opening of said suction channel, said through-passage which can be sealingly closed and opened being arranged coaxially at an end of said axially extending bore, said auxiliary branch channel arrangement further incorporating auxiliary branch channel means provided at said aperture support for flow communicating said ring-shaped channel and said throughpassage.

5. The conductivity measuring cell as defined in claim 4, wherein said ring-shaped groove is provided at said aperture support.

6. The conductivity measuring cell as defined in claim 4, wherein said auxiliary branch channel means incorporates an axially extending bore means provided at the aperture support, said means for sealingly closing and opening said throughpassage comprises a control plunger displaceably guided at said axial extending bore means of said aperture support, said control plunger including a closure head cooperating with said throughpassage.

7. A conductivity measuring cell as defined in claim 6, further including means providing a spring-like restoring force for said control plunger, said control plunger being movable manually against the action of said restoring force from a rest position into a work position.

* * * * *